UNITED STATES PATENT OFFICE.

JOHN R. MARDICK, OF NEW YORK, N. Y., ASSIGNOR TO UNION & CARBON RESEARCH LABORATORIES, INC., A CORPORATION OF NEW YORK.

PROCESS OF MAKING ALUMINUM HALIDES AND ALKALINE-EARTH-METAL CARBIDES.

No Drawing. Application filed July 21, 1923. Serial No. 653,046.

This invention relates to improvements in the manufacture of halides of aluminum, particularly the chlorid, by halogenation of bauxite or other suitable aluminous material in the presence of carbon. An important feature of the invention is the use of alkaline earth metal halides as the source of the halogen, and the formation of alkaline earth metal carbides as a valuable by-product.

In accordance with a preferred form of the present process, previously calcined bauxite and calcium chloride are mixed with carbon and subjected to a temperature of about 700°–800° C., preferably in an electric furnace. The temperature may be raised progressively to a maximum of approximately 2000° C. The reaction may be represented by the following equation:

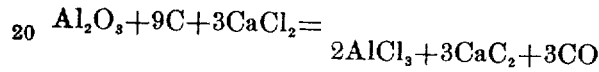
$$Al_2O_3 + 9C + 3CaCl_2 = 2AlCl_3 + 3CaC_2 + 3CO$$

The proportions of the reacting materials may be about the same as those theoretically required by the equation. For example, a suitable charge is composed of 100 parts each of aluminum oxid and carbon and 330 parts of calcium chlorid. The preliminary removal of at least the greater portion of the water from the bauxite and calcium chlorid is necessary to prevent the formation of hydrochloric acid.

The bauxite should be comminuted, before or after dehydration, so that it will pass through a screen of relatively fine mesh. The calcium chlorid may be the fused commercial product, broken into granules, and the carbon may be granular coke. Calcium chlorid is preferred on account of its abundance and low cost, but other alkaline earth metal halides may be used.

The aluminous material should be comparatively free from elements capable of uniting with the alkaline earth metal under the conditions of the process, in order that a maximum proportion of the alkaline earth metal in the charge may be available for carbide production. For example, the silica content of the aluminous material should be low, else a valueless calcium silicate slag will be formed and the production of carbide correspondingly reduced. Bauxite usually does not contain silicon or other objectionable elements in harmful amounts. When materials of higher silicon content are used, suitable addition of fluxes may be made, or other treatment adopted to fit the materials for the chlorid and carbide forming reaction.

It is frequently desirable to conduct the heating in three stages, first at a temperature of from about 700° to 800° C., then from 800° to 1200° C., and finally from 1200° to 2000° C. or more. During the first stage, there is little or no reaction, but water will be expelled as steam, unless water has been previously completely removed from the charge. In the second stage hydrochloric acid may be formed, if water is present, and the acid may be recovered, if desirable. The main production of aluminum chlorid, as well as of calcium carbide, begins above 1200° S. and continues throughout the third stage. The progress of the reaction may be judged by the volume of aluminum chlorid fumes produced. When these no longer appear in quantity, the heating may be discontinued.

Suitable condensers, either with or without solvent liquids, may be supplied to receive the aluminum chlorid vapors. The chlorid should generally be condensed without permitting access of moisture, as the anhydrous chlorid has special value, being useful as a chemical reagent, and particulary in the treatment of petroleum oils. The calcium carbide collects in the bottom of the furnace and may be tapped off from time to time, or at the close of the reaction.

If the charge is well mixed, good results may be obtained although the temperature in the third stage is not carried much above 1800° C. It is advantageous to briquet the mixed charge. In some cases leaching of the residue remaining after removal of the carbide may be desirable, especially when the temperature has not been raised to a point at which all aluminum chlorid is certain to be volatilized.

I am aware that it has been proposed to prepare aluminum chlorid by reacting with calcium chlorid upon aluminous materials associated with sufficient silica to combine with all or a large part of the calcium. The temperature in this prior process is maintained below that at which aluminum chlorid volatilizes and the fused product is run into water. Carbon may be present in such prior process, primariy to increase the electrical conductivity of the charge. It is possible that a portion of the calcium may combine with carbon to form carbide, but any carbide produced is destroyed by the subsequent treatment of the product with water. Also, the value of the aluminum chlorid for most purposes is greatly diminished by the fact that it is obtained in hydrated condition. As distinguished from the foregoing, the present invention is operated under such conditions that alkaline earth metal carbide is formed and recovered in valuable amounts, simultaneously with the production of good yields of anhydrous aluminum chlorid.

I claim:

1. Process which comprises heating together an aluminous material, an alkaline earth metal halide, and carbon, under such conditions that an aluminum halide is volatilized from the charge and an alkaline earth metal carbide is produced in recoverable form.

2. Process according to claim 1, in which the aluminous material is dehydrated bauxite.

3. Process according to claim 1, in which the alkaline earth metal halide is calcium chlorid in substantially anhydrous condition.

4. Process which comprises heating together bauxite, calcium chloride, and carbon, under substantially anhydrous conditions and to such a temperature that calcium carbide is produced in recoverable form.

5. Process of producing aluminum chlorid and alkaline earth metal carbide, comprising reacting with an alkaline earth metal chlorid and carbon upon aluminous material under such conditions that aluminum chlorid is volatilized, and alkaline earth metal carbide is formed in fused condition, collecting the volatilized aluminum chlorid, and tapping off the fused carbide.

6. The invention according to claim 5, in which residual material is leached to recover aluminum chlorid contained in it.

7. Process of producing anhydrous aluminum chlorid and calcium carbide, comprising heating dehydrated bauxite with dehydrated calcium chlorid and carbon to a temperature of 700°–800° C. to expel any water contained in the charge, raising the temperature progressively to about 2000° C. whereby aluminum chlorid is volatilized and calcium carbide formed in fused condition, and recovering the chlorid and carbide.

In testimony whereof, I affix my signature.

JOHN R. MARDICK.

produced is destroyed by the subsequent treatment of the product with water. Also, the value of the aluminum chlorid for most purposes is greatly diminished by the fact that it is obtained in hydrated condition. As distinguished from the foregoing, the present invention is operated under such conditions that alkaline earth metal carbide is formed and recovered in valuable amounts, simultaneously with the production of good yields of anhydrous aluminum chlorid.

I claim:

1. Process which comprises heating together an aluminous material, an alkaline earth metal halide, and carbon, under such conditions that an aluminum halide is volatilized from the charge and an alkaline earth metal carbide is produced in recoverable form.

2. Process according to claim 1, in which the aluminous material is dehydrated bauxite.

3. Process according to claim 1, in which the alkaline earth metal halide is calcium chlorid in substantially anhydrous condition.

4. Process which comprises heating together bauxite, calcium chloride, and carbon, under substantially anhydrous conditions and to such a temperature that calcium carbide is produced in recoverable form.

5. Process of producing aluminum chlorid and alkaline earth metal carbide, comprising reacting with an alkaline earth metal chlorid and carbon upon aluminous material under such conditions that aluminum chlorid is volatilized, and alkaline earth metal carbide is formed in fused condition, collecting the volatilized aluminum chlorid, and tapping off the fused carbide.

6. The invention according to claim 5, in which residual material is leached to recover aluminum chlorid contained in it.

7. Process of producing anhydrous aluminum chlorid and calcium carbide, comprising heating dehydrated bauxite with dehydrated calcium chlorid and carbon to a temperature of 700°–800° C. to expel any water contained in the charge, raising the temperature progressively to about 2000° C. whereby aluminum chlorid is volatilized and calcium carbide formed in fused condition, and recovering the chlorid and carbide.

In testimony whereof, I affix my signature.

JOHN R. MARDICK.

Certificate of Correction.

It is hereby certified that the name of the assignee in Letters Patent No. 1,600,899, granted September 21, 1926, upon the application of John R. Mardick, of New York, N. Y., for an improvement in " Processes of Making Aluminum Halides and Alkaline-Earth-Metal Carbides," was erroneously described and specified as " Union & Carbon Research Laboratories, Inc.," whereas said name should have been described and specified as *Union Carbide & Carbon Research Laboratories, Inc.*, as shown by the records of assignments in this office; and that the said Letters Patent should be read with this correction therein that the same may conform to the record of the case in the Patent Office.

Signed and sealed this 12th day of October, A. D. 1926.

[SEAL.]

M. J. MOORE,
*Acting Commissioner of Patents.*

Certificate of Correction.

It is hereby certified that the name of the assignee in Letters Patent No. 1,600,899, granted September 21, 1926, upon the application of John R. Mardick, of New York, N. Y., for an improvement in "Processes of Making Aluminum Halides and Alkaline-Earth-Metal Carbides," was erroneously described and specified as "Union & Carbon Research Laboratories, Inc.," whereas said name should have been described and specified as *Union Carbide & Carbon Research Laboratories, Inc.*, as shown by the records of assignments in this office; and that the said Letters Patent should be read with this correction therein that the same may conform to the record of the case in the Patent Office.

Signed and sealed this 12th day of October, A. D. 1926.

[SEAL.]

M. J. MOORE,
*Acting Commissioner of Patents.*